US008321796B2

(12) United States Patent
Lyle et al.

(10) Patent No.: US 8,321,796 B2
(45) Date of Patent: Nov. 27, 2012

(54) DYNAMIC MEETING AGENDA GENERATION BASED ON PRESENTER AVAILABILITY

(75) Inventors: Ruhie D. Lyle, Durham, NC (US); Angela Richards Jones, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1216 days.

(21) Appl. No.: 11/868,480

(22) Filed: Oct. 6, 2007

(65) Prior Publication Data

US 2009/0094532 A1    Apr. 9, 2009

(51) Int. Cl.
*G06F 3/00* (2006.01)
(52) U.S. Cl. .................. 715/753; 715/751; 715/700
(58) Field of Classification Search .......... 715/753, 715/751, 700; 705/8, 9
See application file for complete search history.

(56) References Cited

U.S. PATENT DOCUMENTS

| 5,124,912 | A | 6/1992 | Hotaling et al. |
| 6,781,920 | B2 | 8/2004 | Bates et al. |
| 7,027,995 | B2 | 4/2006 | Kaufman et al. |
| 2001/0014866 | A1* | 8/2001 | Conmy et al. ............... 705/9 |
| 2003/0220826 | A1* | 11/2003 | Mansour .................... 705/8 |
| 2006/0053196 | A1* | 3/2006 | Spataro et al. ............ 709/205 |
| 2006/0224430 | A1* | 10/2006 | Butt ........................... 705/8 |

OTHER PUBLICATIONS

"More Like This Patent Application US 20090094532", retrieved on Jul. 13, 2012, at <<http://www.ip.com/morelike.html>>, pp. 2.*
Cahill, L.M., et al; Dynamic Calendar Manipulator; IBM TDB, v37. n1, 1-94, pp. 105-108.
Crawford, Elisabeth, et al; Mechanism Design for Multi-Agent Meeting Scheduling Including Time Preferences, Availability, and Value of Presence; Int'l Conference on Intelligent Agent Technology, 2004 (IAT 2004), IEEE/WIC/ACM; pp. 253-259.
Hassine, Ahlem Ben, et al; Agent-Based Approach to Dynamic Meeting Scheduling Problems; Int'l Conference on Autonomous Agents archive; Proceedings of the 3rd Int'l Joint Conference on Autonomous Agents & Multiagent Systems, vol. 3, 2004, pp. 1132-1139.
Jennings, N.R., et al; Agent-based Meeting Scheduling: A Design and Implementation; IEE Electronics Letters, 1995, pp. 3-4.

* cited by examiner

*Primary Examiner* — Tadeese Hailu
*Assistant Examiner* — Darrin Hope
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to C&S e-meeting scheduling and provide a method, system and computer program product for dynamic agenda updating in a C&S system. In an embodiment of the invention, a method for dynamic agenda updating based upon presenter participation in an e-meeting can be provided. The method can include creating a new e-meeting in a collaborative computing environment for attendees and presenters selected from amongst the attendees. The method also can include generating an invite with an agenda for the new e-meeting including a time block and time slots for presentations by different ones of the presenters. Finally, the method can include dynamically changing a view to the agenda for viewing ones of the attendees to reflect changes in the time slots resulting from replies to the invite received by individual ones of the presenters.

17 Claims, 2 Drawing Sheets

DYNAMIC MEETING AGENDA GENERATION BASED ON PRESENTER AVAILABILITY

BACKGROUND OF THE INVENTION

1. Field of the Invention

The present invention relates to the field of computer based calendaring and scheduling (C&S) and more particularly to meeting agenda generation in a C&S system.

2. Description of the Related Art

Calendaring systems have formed the core component of personal information management software and firmware applications for decades. Initially, a mere calendar display, modem calendaring systems provide scheduling and alarm functions in addition to full integration with contact management, time entry, billing and project management applications. The typical calendaring application minimally provides a mechanism for scheduling an event to occur on a certain date at a certain time. Generally, the event can be associated with a textual description of the event. More advanced implementations also permit the association of the scheduled event with a particular contact, a particular project, or both. Furthermore, most calendar applications provide functionality for setting an alarm prior to the occurrence of the event, as well as archival features.

Several software products include support for Calendaring & Scheduling (C&S). Known C&S products include Lotus Notes, Microsoft Outlook, and web-based products like Yahoo! Calendar. These products allow one to manage personal events including appointments and anniversaries. C&S products also typically allow one to manage shared events, referred to generally as e-meetings.

E-meetings scheduled within a C&S system often provide for several e-meeting presenters. An e-meeting presenter is a participant to a meeting who leads at least a portion of the e-meeting by presenting content, either through real-time communications and messaging, conferencing, application sharing/screen sharing or white-boarding. Oftentimes, presenters upload content to the e-meeting room in advance of the e-meeting for e-meeting participants to review asynchronously. Thus, as presenters drive the nature of an e-meeting, knowing for certain the identity of those presenters guaranteed to attend an e-meeting can be critical.

At the time of scheduling an e-meeting in a C&S system, the e-meeting chairperson through a user interface provided by the C&S system can select a block of time for the e-meeting and can create an agenda that spans the block of time. Of note, though, the agenda often can be dependent upon the participation of others—namely the presenters. To the extent that the number and identity of the presenters to a meeting change, so too must the agenda.

For example, in some circumstances, a presenter may decline an invitation to an e-meeting, or the presentation of one presenter may exceed an allotted time preventing subsequent presenters from participating in the e-meeting. At present, however, the agenda to an e-meeting cannot be updated based upon changes in the number and identity of presenters participating. Rather, agendas are fixed and immovable once set at the outset irrespective of the number and identity of presenters to an e-meeting.

BRIEF SUMMARY OF THE INVENTION

Embodiments of the present invention address deficiencies of the art in respect to C&S e-meeting scheduling and provide a novel and non-obvious method, system and computer program product for dynamic agenda updating in a C&S system. In an embodiment of the invention, a method for dynamic agenda updating based upon presenter participation in an e-meeting can be provided. The method can include creating a new e-meeting in a collaborative computing environment for attendees and presenters selected from amongst the attendees. The method also can include generating an invite or an update to an invite with an agenda for the new e-meeting including a time block and time slots for presentations by different ones of the presenters. Finally, the method can include dynamically changing a view to the agenda for viewing ones of the attendees to reflect changes in the time slots resulting from replies to the invite received by individual ones of the presenters.

In one aspect of the embodiment, dynamically changing a view to the agenda for viewing ones of the attendees to reflect changes in the time slots resulting from replies to the invite received by individual ones of the presenters can include providing an initial view to the agenda for viewing ones of the attendees through the invite, receiving a reply from a presenter requiring a change to at least one of the time slots of the time block in the agenda, revising the agenda to reflect the change to the at least one of the time slots of the time block, and providing a new view of the revised agenda for viewing ones of the attendees through the invite. By way of example, receiving a reply from a presenter requiring a change to at least one of the time slots of the time block in the agenda can include receiving a reply such as an acceptance to the invite, a declination to the invite, and a delegation of the invite to an alternative presenter.

Optionally, revising the agenda to reflect the change to the at least one of the time slots of the time block can include determining that the reply is a declination to the invite and removing a time slot associated with the declination from the time block. Also, revising the agenda to reflect the change to the at least one of the time slots of the time block can include determining that the reply is a delegation of the invite to an alternative presenter and assigning a time slot associated with the delegation to the alternative presenter. Yet further, revising the agenda to reflect the change to the at least one of the time slots of the time block can include determining that the reply is an acceptance of the invite, assigning a time slot associated with the acceptance of the invite to the presenter, marking the assigned time slot as flexible, and subsequently re-assigning a different time slot to the presenter to accommodate a different presenter.

In another embodiment of the invention, a C&S data processing system can be provided. The system can include a collaborative environment executing in a collaborative server and communicatively coupled to collaborative client hosts hosting respective collaborative clients providing C&S services. The system also can include a data store of e-meetings scheduled in the collaborative environment, each e-meeting including an agenda, the agenda including a selection of presenters amongst attendees to the e-meeting, the agenda further including a topic and allotted time for each of the presenters. Finally, the system can include dynamic agenda management logic coupled to the collaborative environment. The logic can include program code enabled to create a new e-meeting in the data store, to generate an invite with an agenda for the new e-meeting including a time block and a plurality of time slots for presentations by different presenters, and to dynamically change a view to the agenda for viewing attendees to reflect changes in the time slots resulting from replies to the invite received by the different presenters.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic agenda updating based upon presenter participation in an e-meeting. In accordance with an embodiment of the present invention, an agenda can be established for an e-meeting with one or more attendees designated to present in respective time slots for the agenda. Invitations to the e-meeting including a contemporaneous form of the agenda can be forwarded to the attendees and, subsequently, the agenda can dynamically change as different ones of the presenters accept or decline attending the e-meeting and as different ones of the time slots are designated for presentation by different ones of the presenters. Accordingly, whenever the invitation is viewed by the attendees, a contemporaneous form of the dynamically changing agenda can be provided.

Figure 1:
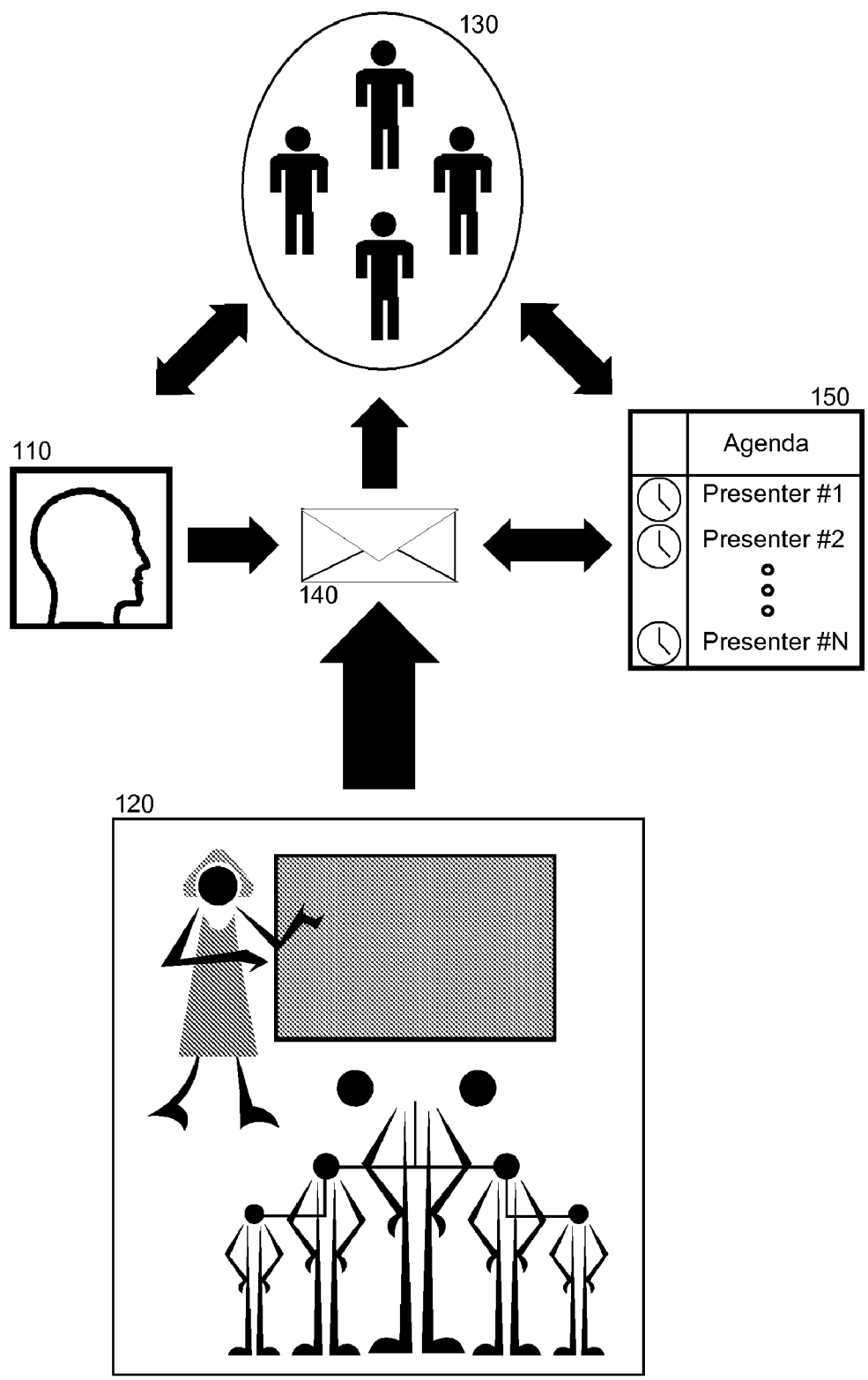
FIG. 1 is a pictorial illustration of a process for dynamic agenda updating based upon presenter participation in an e-meeting.

In further illustration, FIG. 1 pictorially depicts a process for dynamic agenda updating based upon presenter participation in an e-meeting. As shown in FIG. 1, an e-meeting organizer 110 can prepare an invitation 140 to invite a group of attendees 130 to attend an e-meeting 120. The invitation 140 can specify the nature of the e-meeting along with an agenda 150. In this regard, one or more of the attendees 130 can be designated to present in corresponding time slots in a block of time set forth in the agenda 150. The designation of the presenting ones of the attendees 130 can be set forth in the invitation 140.

Once the invitation 140 has been provided to the attendees 130, each of the attendees 130 designated to present can review a suggested time slot in the agenda 150. In response, each of the attendees 130 designated to present can accept the suggested time slot in the agenda 150, propose one or more different time slots in the agenda 150, decline to present entirely, delegate the presentation responsibility to a different one of the attendees 130, or any combination thereof. Optionally, alternative time slots in the agenda 150 further can be provided. Yet further, different time slots can be marked flexible such that other attendees 130 designated to present can select a flexible time slot for presenting and attendees 130 marking the time slot flexible can be rescheduled for a different time slot in the agenda 150.

Notably, the block of time can be modified dynamically depending upon the behavior of the presenting ones of the attendees 130. In this regard, when a presenting one of the attendees 130 declines the invitation 140, the time slot in the block of time intended for the declining one of the attendees 130 can be removed from the block of time effectively shortening the e-meeting 120. The actual times for remaining time slots in the block of time can change accordingly. During the course of time between the invitation 140 and the conduct of the e-meeting 120, at any given time, any of the attendees 130 can review the invitation 140 referencing a contemporary form of the agenda 150 in which presenting ones of the attendees 130 and corresponding time slots can be provided. In this way, the dynamic nature of the agenda 150 will be recognized by the attendees 130.

Figure 2:
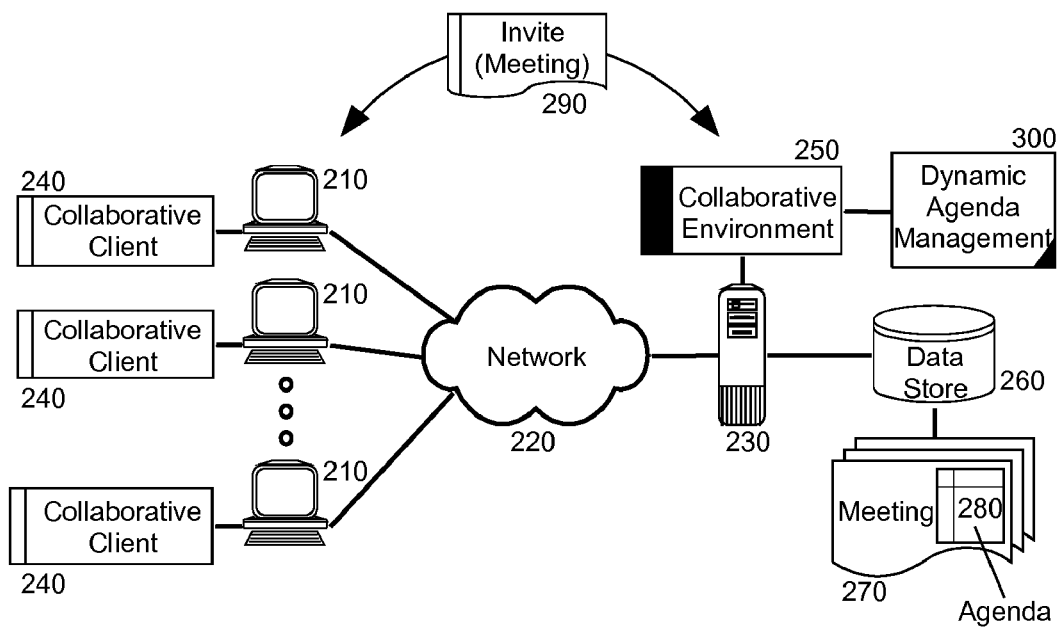
FIG. 2 is a schematic illustration of a C&S system configured for dynamic agenda updating based upon presenter participation in an e-meeting; and, FIG. 3 is a flow chart illustrating a process for dynamic agenda updating based upon presenter participation in an e-meeting.

The process shown in FIG. 1 can be implemented in C&S data processing system. To that end, FIG. 2 schematic illustrates a C&S data processing system configured for dynamic agenda updating based upon presenter participation in an e-meeting. The system can include a collaborative server 230 communicatively coupled to one or more collaborative client hosts 210 over a computer communications network 220. The collaborative server 230 can support the operation of a collaborative environment 250 providing a collaborative interface for a C&S system to different collaborative clients 240 executing in respective ones of the collaborative client hosts 210.

The collaborative environment 250 can include a data store 260 of different scheduled e-meetings 270, each of the e-meetings 270 including a corresponding agenda 280. Each agenda 280 can include a set of presenters scheduled to present a topic during a time slot in a block of time for the e-meeting 270. Notably, dynamic agenda management logic 300 further can be provided in connection with the collaborative environment 250 to support dynamic agenda updating based upon presenter participation in an e-meeting.

Specifically, the dynamic agenda management logic 300 can include program code enabled to dynamically change the agenda 280 for an e-meeting 270 according to invited presenter responses to an invite 290 for the e-meeting 270. Initially, before any presenters scheduled to present respond to the invite 290, the agenda 280 can reflect the invited presenters and a specified topic along with an allotted period of time in a time slot for each of the presenters. No order of presentation need be specified. Thereafter, as invited presenters respond to the invite 290, a more detailed form of the agenda 280 can be provided on request.

Specifically, the program code of the dynamic agenda management logic 300 can be enabled to change the assignment of different time slots to different presenters in the agenda 280 as different presenters accept the invitation to present, decline the invitation to present, accept the invitation present but in a different time slot, or request a substitute presenter as a proxy for a time slot. Additionally, the program code can be enabled to modify the time block for the e-meeting 270 to accommodate fewer time slots than initially required. In this way, the agenda 280 as viewed through the invite 290 can dynamically change leading up to the e-meeting 270 dependent upon the responses of the presenters to the invite 290.

Figure 3:
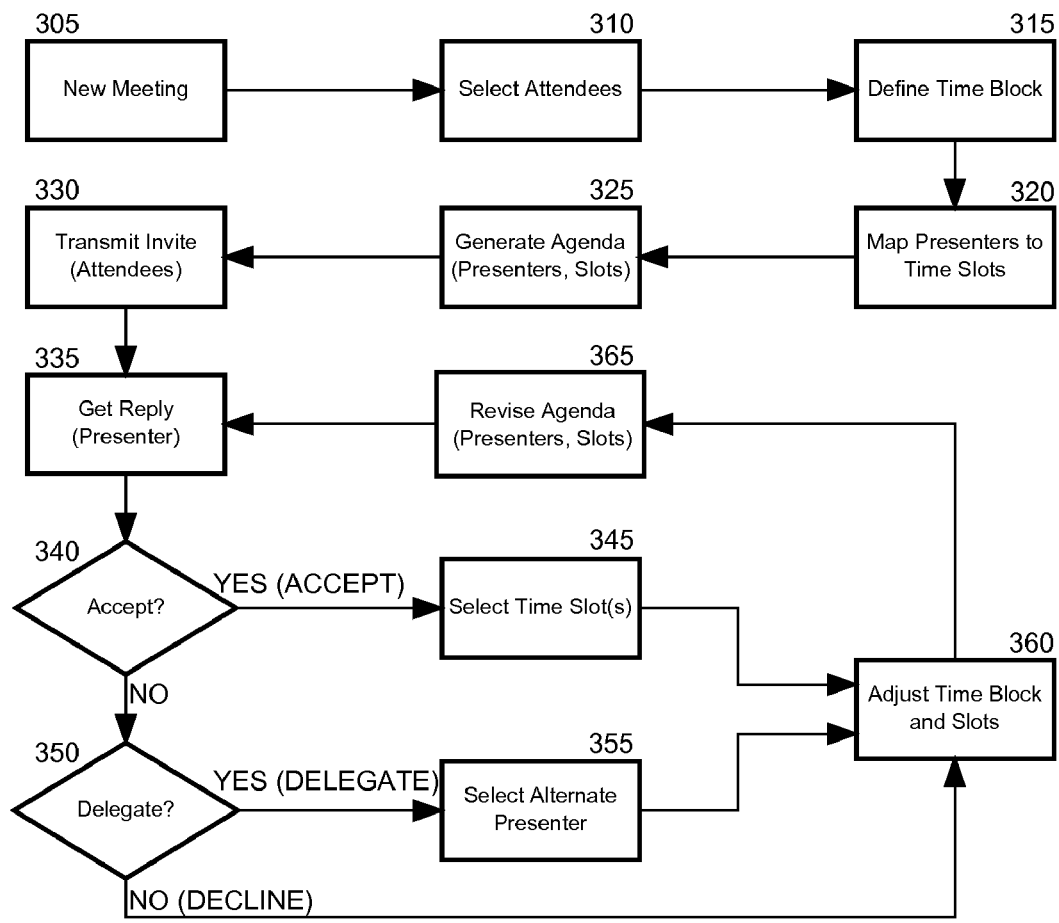

In further illustration of the operation of the dynamic agenda management logic 300, FIG. 3 is a flow chart illustrating a process for dynamic agenda updating based upon presenter participation in an e-meeting. Beginning in block 305, a new e-meeting can be created and in block 310 a selection of attendees can be specified for the e-meeting. In block 315, a time block can be defined for the e-meeting and in block 320, different ones of the selection of attendees can be selected to present within time slots in the time block. Thereafter, in block 325 an agenda for the e-meeting can be generated for the e-meeting to include the presenters, corresponding topics and allotted time for each presentation. Finally, in block 330 the invite can be transmitted to each of the attendees.

In block 335, a reply can be received from a presenting one of the attendees. In decision block 340, if the reply is an acceptance to the invite, then in block 345 a time slot within the time block can be mapped to the presenting one of the attendees. In this regard, within the reply, the presenting one of the attendees can accept the originally proposed time slot, or the presenting one of the attendees can request a different time slot in the time block. Optionally, the presenting one of the attendees can specify multiple different acceptable time slots with our without an order of preference for the different time slots. Yet further, the presenting one of the attendees can indicate whether a preference for a time slot is flexible such that the time slot can be re-assigned to a different presenter as need be.

By comparison, if in decision block 340 the reply is not an acceptance to the invite, in decision block 350 it can be determined if the reply is a request to delegate the presentation to a different presenter. If so, in block 355 an alternate presenter can be specified for association with a time slot in the time block. Otherwise, it can be presumed that the reply is a declination of the invite. In all three circumstances, in block 360 the time block and corresponding time slots can be adjusted for the reply of the presenting one of the attendees.

In this regard, in the event of a declination, the time slot can be removed from the time block and the time block can be shortened, or the time slot can be left open for assignment to a different presenting one of the attendees. In contrast, in the event that reply of the presenting one of the attendees specifies a time slot already flexibly assigned to a different presenter, the time slot can be associated with the presenting one of the attendees and an alternate time slot can be associated with the different presenter. Finally, in block 365 a revised agenda can be prepared to reflect the newly adjusted time block and the replies of the presenters and the process can repeat through block 335 until the occurrence of the e-meeting.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for dynamic agenda updating based upon presenter participation in an e-meeting, the method comprising:

creating a new e-meeting in a collaborative computing environment for a plurality of attendees and presenters selected from amongst the attendees;

generating one of an invite and an update to an invite with an agenda for the new e-meeting including a time block and a plurality of time slots for presentations by different ones of the presenters; and, dynamically changing a view to the agenda for viewing ones of the attendees to reflect changes in the time slots resulting from replies to the invite received by individual ones of the presenters.

2. The method of claim 1, wherein generating one of an invite and an update to an invite with an agenda for the new e-meeting including a time block and a plurality of time slots for presentations by different ones of the presenters, comprises:

generating an agenda for the new e-meeting, the agenda comprising a selection of presenters and corresponding topics and allotted times to present the corresponding topics; and, mapping the presenters to respective ones of the time slots in the time block.

3. The method of claim 1, wherein dynamically changing a view to the agenda for viewing ones of the attendees to reflect changes in the time slots resulting from replies to the invite received by individual ones of the presenters, comprises:

providing an initial view to the agenda for viewing ones of the attendees through the invite;

receiving a reply from a presenter requiring a change to at least one of the time slots of the time block in the agenda;

revising the agenda to reflect the change to the at least one of the time slots of the time block; and, providing a new view of the revised agenda for viewing ones of the attendees through the invite.

4. The method of claim 3, wherein receiving a reply from a presenter requiring a change to at least one of the time slots of the time block in the agenda, comprises receiving a reply selected from the group consisting of an acceptance to the invite, a declination to the invite, and a delegation of the invite to an alternative presenter.

5. The method of claim 4, wherein revising the agenda to reflect the change to the at least one of the time slots of the time block, comprises:

determining that the reply is a declination to the invite; and,
removing a time slot associated with the declination from the time block.

6. The method of claim 4, wherein revising the agenda to reflect the change to the at least one of the time slots of the time block, comprises:
   determining that the reply is a delegation of the invite to an alternative presenter; and,
   assigning a time slot associated with the delegation to the alternative presenter.

7. The method of claim 4, wherein revising the agenda to reflect the change to the at least one of the time slots of the time block, comprises:
   determining that the reply is an acceptance of the invite;
   assigning a time slot associated with the acceptance of the invite to the presenter;
   marking the assigned time slot as flexible; and,
   subsequently re-assigning a different time slot to the presenter to accommodate a different presenter.

8. The method of claim 5, further comprising reducing a size of the time block to account for the removed time slot.

9. A calendaring and scheduling (C&S) data processing system comprising:
   a collaborative environment executing in a collaborative server and communicatively coupled to a plurality of collaborative client hosts hosting respective collaborative clients providing C&S services;
   a data store of e-meetings scheduled in the collaborative environment, each e-meeting comprising an agenda, the agenda comprising a selection of presenters amongst attendees to the e-meeting, the agenda further comprising a topic and allotted time for each of the presenters; and,
   dynamic agenda management logic coupled to the collaborative environment, the logic comprising program code enabled to create a new e-meeting in the data store, to generate an invite with an agenda for the new e-meeting including a time block and a plurality of time slots for presentations by different presenters, and to dynamically change a view to the agenda for viewing attendees to reflect changes in the time slots resulting from replies to the invite received by the different presenters.

10. A computer program product comprising a computer usable storage medium storing thereon computer usable program code for dynamic agenda updating based upon presenter participation in an e-meeting, the computer program product comprising:
   computer usable program code for creating a new e-meeting in a collaborative computing environment for a plurality of attendees and presenters selected from amongst the attendees;
   computer usable program code for generating one of an invite and an update to an invite with an agenda for the new e-meeting including a time block and a plurality of time slots for presentations by different ones of the presenters; and,
   computer usable program code for dynamically changing a view to the agenda for viewing ones of the attendees to reflect changes in the time slots resulting from replies to the invite received by individual ones of the presenters.

11. The computer program product of claim 10, wherein the computer usable program code for generating one of an invite and an update to an invite with an agenda for the new e-meeting including a time block and a plurality of time slots for presentations by different ones of the presenters, comprises:
   computer usable program code for generating an agenda for the new e-meeting, the agenda comprising a selection of presenters and corresponding topics and allotted times to present the corresponding topics; and,
   computer usable program code for mapping the presenters to respective ones of the time slots in the time block.

12. The computer program product of claim 10, wherein the computer usable program code for dynamically changing a view to the agenda for viewing ones of the attendees to reflect changes in the time slots resulting from replies to the invite received by individual ones of the presenters, comprises:
   computer usable program code for providing an initial view to the agenda for viewing ones of the attendees through the invite;
   computer usable program code for receiving a reply from a presenter requiring a change to at least one of the time slots of the time block in the agenda;
   computer usable program code for revising the agenda to reflect the change to the at least one of the time slots of the time block; and,
   computer usable program code for providing a new view of the revised agenda for viewing ones of the attendees through the invite.

13. The computer program product of claim 12, wherein the computer usable program code for receiving a reply from a presenter requiring a change to at least one of the time slots of the time block in the agenda, comprises computer usable program code for receiving a reply selected from the group consisting of an acceptance to the invite, a declination to the invite, and a delegation of the invite to an alternative presenter.

14. The computer program product of claim 13, wherein the computer usable program code for revising the agenda to reflect the change to the at least one of the time slots of the time block, comprises:
   computer usable program code for determining that the reply is a declination to the invite; and,
   computer usable program code for removing a time slot associated with the declination from the time block.

15. The computer program product of claim 13, wherein the computer usable program code for revising the agenda to reflect the change to the at least one of the time slots of the time block, comprises:
   computer usable program code for determining that the reply is a delegation of the invite to an alternative presenter; and,
   computer usable program code for assigning a time slot associated with the delegation to the alternative presenter.

16. The computer program product of claim 13, wherein the computer usable program code for revising the agenda to reflect the change to the at least one of the time slots of the time block, comprises:
   computer usable program code for determining that the reply is an acceptance of the invite;
   computer usable program code for assigning a time slot associated with the acceptance of the invite to the presenter;
   computer usable program code for marking the assigned time slot as flexible; and,
   computer usable program code for subsequently re-assigning a different time slot to the presenter to accommodate a different presenter.

17. The computer program product of claim 14, further comprising computer usable program code for reducing a size of the time block to account for the removed time slot.

* * * * *